United States Patent
Singh et al.

(10) Patent No.: US 11,023,361 B1
(45) Date of Patent: Jun. 1, 2021

(54) INTELLIGENT AUTOMATED WAY OF BASELINING INTEGRATION CONTENT USING MESSAGES FROM HISTORICAL TESTS TO BE USED FOR REGRESSION TESTING

(71) Applicant: SAP SE, Walldorf (DE)

(72) Inventors: Kanwaljit Singh, Bangalore (IN); Mamatha Vittalkar, Plano, TX (US); Chitrasen Singh Oinam, Bangalore (IN); Aravind Chokkalingam, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/701,372

(22) Filed: Dec. 3, 2019

(51) Int. Cl.
*G06F 11/36* (2006.01)
*G06F 9/50* (2006.01)
*G06F 9/54* (2006.01)
*H04L 29/08* (2006.01)

(52) U.S. Cl.
CPC ........ *G06F 11/3668* (2013.01); *G06F 9/5027* (2013.01); *G06F 9/547* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,748,584 B1* | 6/2004 | Witchel | ............... | G06F 8/71 714/37 |
| 8,185,877 B1* | 5/2012 | Colcord | ............ | G06F 11/3692 717/127 |
| 8,701,092 B1* | 4/2014 | Colcord | ............ | G06F 11/3688 717/127 |
| 2003/0229825 A1* | 12/2003 | Barry | ............... | G06F 11/3672 714/38.14 |
| 2011/0173591 A1* | 7/2011 | Prasad | ............... | G06F 8/30 717/126 |
| 2014/0013307 A1* | 1/2014 | Hansson | ............ | G06F 11/3688 717/124 |

* cited by examiner

*Primary Examiner* — Qing Chen
(74) *Attorney, Agent, or Firm* — Sterne, Kessler, Goldstein & Fox P.L.L.C.

(57) ABSTRACT

Disclosed herein are system, method, and computer program product embodiments for determining an integration regression between a source system and a target system. An embodiment operates by selecting a first set of messages in a middleware system. The embodiment receives a baseline mapping for the first set of messages from the middleware system. The embodiment creates a test suite based on the first set of messages. The embodiment performs the test suite, wherein the performing generates a second set of messages in the middleware system and a current mapping for the second set of messages. The embodiment compares the first set of messages to the second set of messages based on the baseline mapping and the current mapping. The embodiment determines an integration regression between the source system and the target system based on the comparing.

20 Claims, 4 Drawing Sheets

… (1)

INTELLIGENT AUTOMATED WAY OF BASELINING INTEGRATION CONTENT USING MESSAGES FROM HISTORICAL TESTS TO BE USED FOR REGRESSION TESTING

BACKGROUND

A user often wants to integrate an application running on their premises (e.g., an Enterprise Resource Planning (ERP) system) with a cloud application. The application running on the user's premises can be integrated with the cloud application using a middleware system (e.g., a cloud based middleware system such as an Integration as a Service (IaaS) system). The middleware system can use a mapping to connect the application running on the user's premises with the cloud application. But the user often does not know when the mapping on the middleware system is updated. This is because the middleware system is often controlled by a different entity. This creates a risk for the user. The mapping on the middleware system may be updated without the user's knowledge and break the integration between the application running on the user's premises and the cloud application. As a result, even though the user may like the flexibility of using a third-party middleware system, the user may prefer to integrate the application running on their premises with the cloud application using their own on premise middleware to avoid an integration breakdown. This is because the user often cannot quickly identify what updates to the mapping in the third-party middleware system caused an integration regression between the application running on their premises and the cloud application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining an integration regression between two applications integrated through a middleware system.

Some solutions for identifying an integration regression between an application running on a user's premises and a cloud application involve the user manually creating test cases. The user creates a new document in a source system. The user then checks whether the new document was created in the source system and whether its creation caused a message to be transmitted to the target system through a middleware system. The user then checks whether a corresponding document was created in the target system. But this process suffers from several problems.

First, the user often has to design new test cases each time there is an upgrade of the mapping at the middleware system. This is cumbersome and error prone. Second, manually designing and executing the test cases is very slow. Finally, it is often difficult for the user to ensure that their new test cases test both standard content and the customizations done on their premises.

Figure 1:
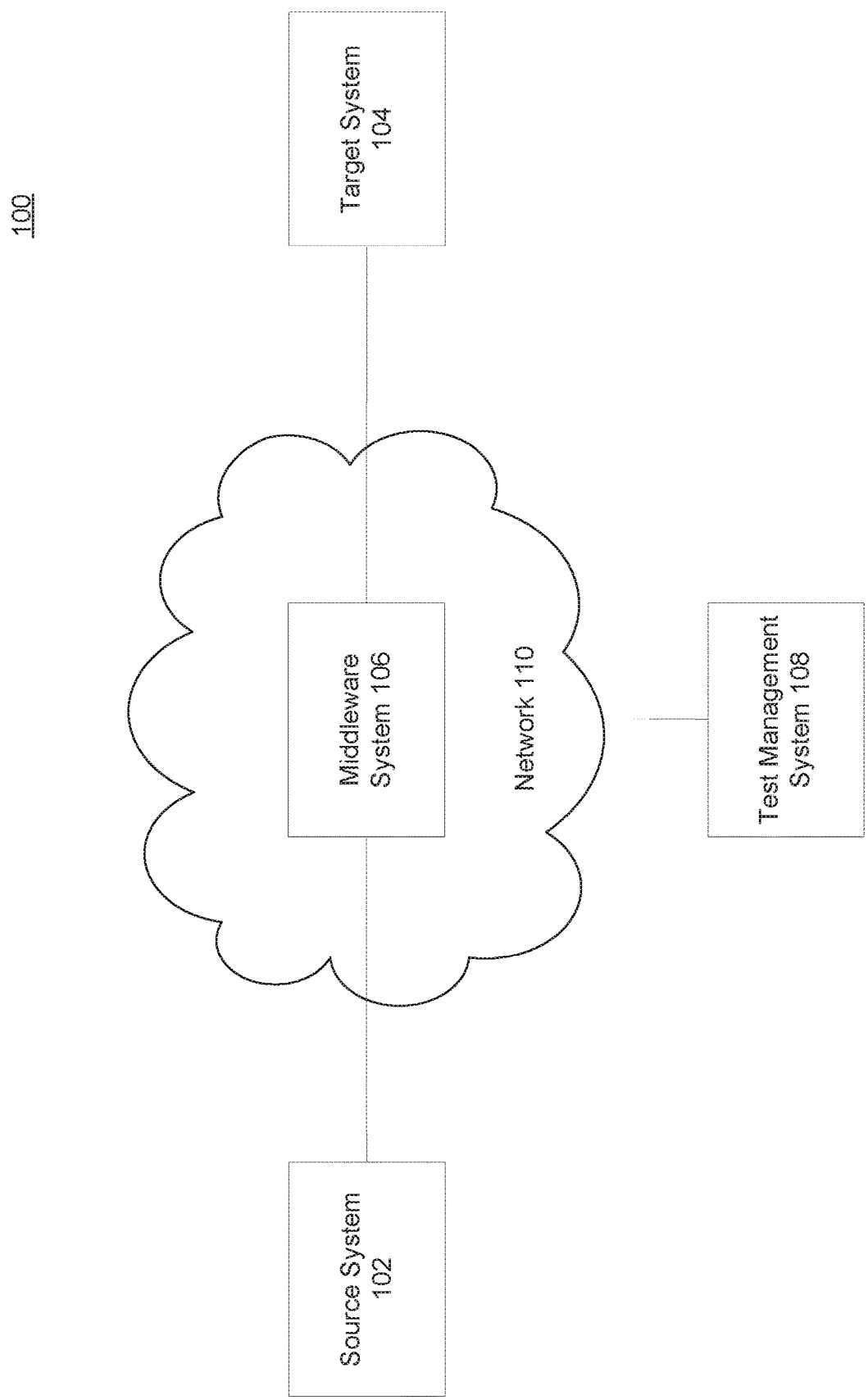
FIG. 1 is a block diagram of an environment in which an application is integrated with another application using a middleware system according to some embodiments.

Embodiments described in this disclosure solve these problems. For example, FIG. 1 is a block diagram of an environment 100 in which an application is integrated with another application using a middleware system, according to some embodiments. Environment 100 can include source system 102, target system 104, middleware system 106, and test management system 108.

Source system 102 can be a computer system at a business's, organization's, or other entity's premises. Source system 102 can be any of a server computer, computer cluster, desktop workstation, laptop or notebook computer, netbook, tablet, personal digital assistant (PDA), smart phone, smart watch or other wearable, appliance, part of the Internet-of-Things, and/or embedded system, to name a few non-limiting examples, or any combination thereof. Source system 102 can run an application that integrates with one or more cloud applications. For example, source system 102 can run an application that generates and transmits order requests to a seller's cloud application running at target system 104.

Target system 104 can represent cloud computing resources controlled by a business, organization, or other entity. Target system 104 can also be a computer system at a business's, organization's, or other entity's premises. Target system 104 can be any of a server computer, computer cluster, desktop workstation, laptop or notebook computer, netbook, tablet, personal digital assistant (PDA), smart phone, smart, watch or other wearable, appliance, part of the Internet-of-Things, and/or embedded system, to name a few non-limiting examples, or any combination thereof. Target system 104 can run an application that integrates with an application running at source system 102. For example, target system 104 can run an application that processes an order request from a buyer application at source system 102.

An application running at source system 102 can communicate with an application running at target system 104 to complete a logical process (e.g., a business process). For example, the business process can include completing a purchase order with a seller. This can involve a buyer application at source system 102 creating an order request document. The buyer application can transmit the order request to a seller application at target system 104. The seller application can process the order request and create an order confirmation document. The seller application can then transmit the order confirmation to the buyer application. Once the order is ready to ship, the seller application can further generate a ship notice document and transmit the ship notice to the buyer application. Lastly, the seller application can generate an invoice request document and transmit the invoice request to the buyer application. Thus, the buyer and seller applications perform a series of transactions in order to complete the business process.

To integrate an application running at source system 102 with an application running at target system 104, the application running at source system 102 can generate one or more messages (e.g., an eXtensible Markup Language (XML) message) for a newly created document (e.g., an order request document). The application running at source system 102 can transmit the messages to the application running at target system 104. The application running at source system 102 can transmit the messages over network 110. Network 110 can include, without limitation, wired and/or wireless intranet, extranet, Internet, cellular, Bluetooth and/or any other local, short range, ad hoc, regional, global communications network, as well as any combination thereof.

An application running at source system 102 can convert a new created document into one or more messages having a standardized format (e.g., an XML message). But this is often insufficient for integrating the application running at source system 102 with an application running at target system 104. This is because source system 102 and target system 104 can use different schemas for their messages. To overcome this technological problem, the application running at source system 102 can exchange messages with the application running at target system 104 through middleware system 106.

Middleware system 106 can be a computer system controlled by a business, organization, or other entity that is different than the entities that control source system 102 and target system 104. Middleware system 106 can be any of a server computer, computer cluster, desktop workstation, laptop or notebook computer, netbook, tablet, personal digital assistant (PDA), smart phone, smart watch or other wearable, appliance, part of the Internet-of-Things, and/or embedded system, to name a few non-limiting examples, or any combination thereof. Middleware system 106 can transform messages from the application running at source system 102 to messages that can be processed by the application running at target system 104. This can enable the integration of the application running at source system 102 with the application running at target system 104. For example, middleware system 106 can transform a message in a source format from the application running at source system 102 to a message in a target format for the application running at target system 104.

Middleware system 106 can transform a message in a source format from the application running at source system 102 to a message in a target format for the application running at target system 104 based on a mapping between the application at source system 102 and the application at target system 104. The mapping can map the schema of the message from source system 102 to the schema of the message for target system 104. The mapping can ensure that the application at source system 102 can reliably communicate with the application at target system 104 to complete a logical process (e.g., a business process). Thus, the mapping can represent integration content for source system 102 and target system 104.

A mapping at middleware system 106 may be updated in response to a change at source system 102 or target system 104. The mapping may be updated when there is a change to the message schema used by source system 102 or target system 102. The updating of the mapping can often break an existing integration between an application at source system 102 and an application at target system 104. This is often problematic for the entity controlling source system 102 (or target system 104). This is because middleware system 106 may not be controlled by the same entity that controls source system 102 (or target system 104). As a result, the entity controlling source system 102 is often unaware of an update to a mapping at middleware system 106, and therefore is unaware when there is a break to an existing integration between an application at source system 102 and an application at target system 104. Moreover, there is often no way for the entity controlling source system 102 to identify what changes caused an integration regression between the application miming on source system 102 and the application running at target system 104.

To solve these technological problems, embodiments herein generate and execute test cases of a test suite based on messages previously transmitted through middleware system 106. The execution of this test suite can identify an integration regression between two applications. In addition, the execution of the test suite can identify the specific basis for the integration regression.

Figure 2:
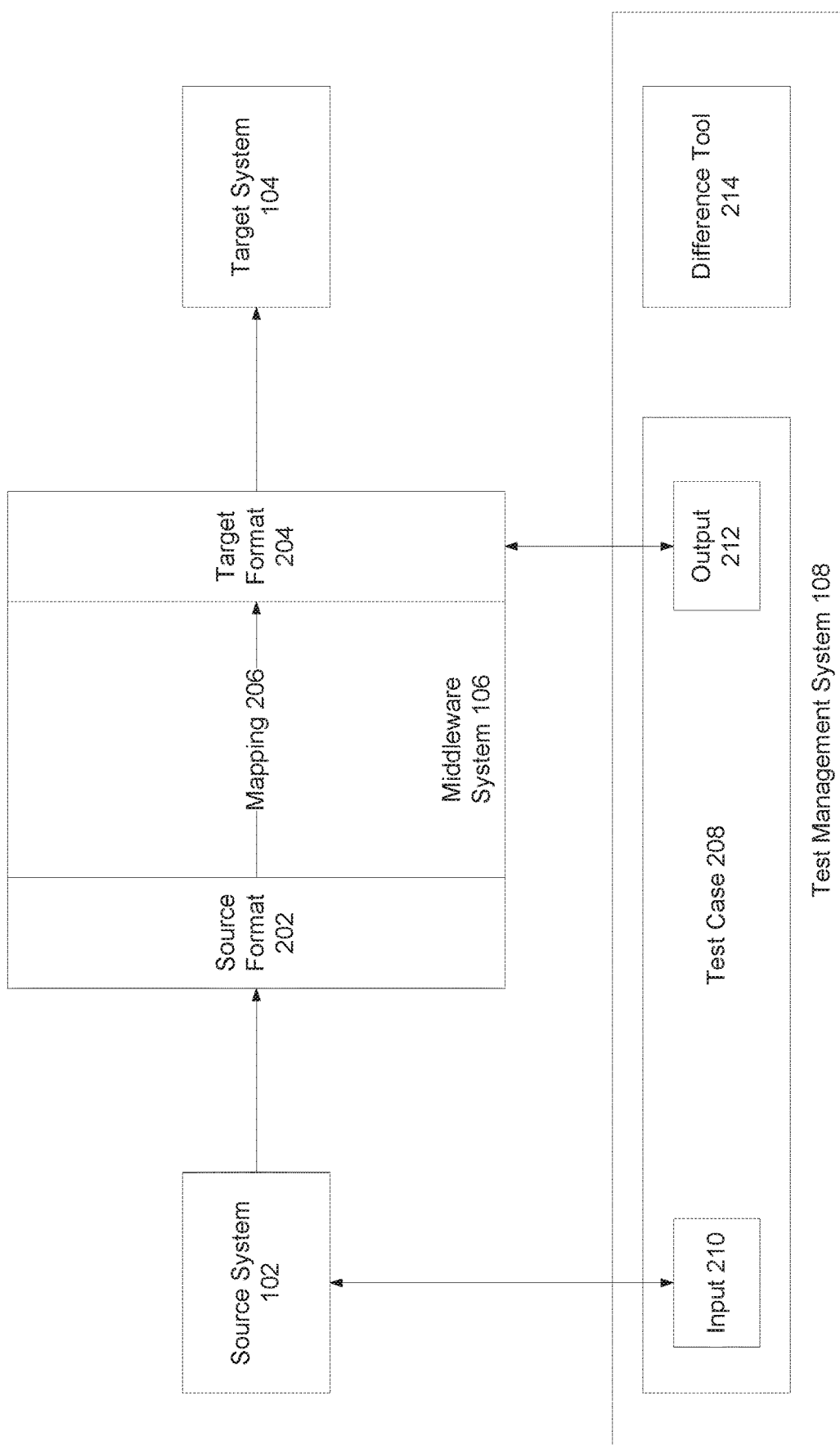
FIG. 2 is a block diagram illustrating the use of a test management system to identify an integration regression between a source system and a target system, according to some embodiments.

FIG. 2 is a block diagram illustrating the use of test management system 108 to identify an integration regression between source system 102 and target system 108, according to some embodiments. FIG. 2 is described with reference to FIG. 1.

Test management system 108 can generate test cases of a test suite based on messages previously exchanged through middleware system 106 by source system 102 and target system 104. Test management system 108 can then execute these test cases to determine if there is an integration regression between source system 102 and target system 108.

A test suite can represent a collection of test cases in a specific order to complete a logical process. For example, in the case of a placing an order between a buyer at source system 102 and a seller at target system 104, a test suite can represent four test cases. First, there can be a test case for creating an order request document at source system 102 and transmitting the order request to target system 104. Second, there can be a test case for target system 104 creating an order confirmation document and transmitting the order confirmation to source system 102. Third, there can be a test case for target system 104 creating a ship notice document and transmitting the ship notice to source system 102. Finally, there can be a test case for target system 104 creating an invoice request document and transmitting the invoice request to source system 102. These four test cases can be performed in order to complete a purchase order business process.

Initially, source system 102 can be integrated with target system 104 through middleware system 106. This can involve source system 102 exchanging messages with target system 104 through middleware system 106. For example, in response to creating a document in source system 102, source system 102 can generate a message corresponding to the document and transmit it middleware system 106. Middleware system 106 can then transmit the message to target system 104. The message can represent a logical transaction of an associated business process. The message can also be the basis for a new test case.

Source system 102 can generate a message based on source format 202. A message in source format 202 can have a specific schema. Similarly, target system 104 can generate and receive a message based on target format 204. A message in target format 204 can have a different schema than a message in source format 202. To enable the integration of source system 102 and target system 104, middleware system 106 can transform a message from source system 102 in source format 202 to a message for target system 104 in target format 204. Middleware system 106 can represent the transformation of a message in source format 202 to a message in target format 204 as mapping 206.

Middleware system 106 can use mapping 206 to enable the integration of source system 102 and target system 104. But mapping 206 may be updated in response to a change at source system 102 or target system 104. For example, mapping 206 may be updated when there is a change to the message schema used by source system 102 or target system 102. Mapping 206 may also be updated by an integration content provider to add new features and or functionality to the integration of source system 102 and target system 104. The updating of mapping 206 can often break an existing integration between an application at source system 102 and an application at target system 104. But the entity controlling source system 102 is often unaware of a break to an existing integration between an application at source system 102 and an application at target system 104. Moreover, the entity controlling source system 102 is often unable to identify what changes caused an integration regression between the application running on source system 102 and the application running at target system 104.

To automatically identify the changes that caused an integration regression, test management system 108 can create a test suite based on messages previously generated between source system 102 and target system 104 when they were successfully integrated. For example, test management system 108 can create a test suite based on a set of baseline messages exchanged through middleware system 106.

Source system 102 can exchange messages with target system 104 through middleware system 106. Middleware system 106 can store these messages in a log for a period of time. Thus, a message in the log of middleware system 106 can represent the successful completion of a baseline logical transaction for a logical process (e.g., a business process). To identify an integration regression between source system 102 and target system 104, test management system 108 can use the messages in the log of middleware system 106 to create new test cases that model existing logical transactions that were successfully performed between source system 102 and target system 104.

To create test cases for a test suite, test management system 108 can select an originating message (also referred to as a parent message) from the log of middleware system 106. An originating message can be a message (e.g., an order request message) that begins a logical process (e.g., completing a purchase order).

Test management system 108 can select the originating message based on document type (e.g., order request, order confirmation, invoice type, etc.) and a transaction number (also referred to as a document number). A transaction number can represent a logical transaction related to a document type for a logical process.

In response to selecting the originating message from the log of middleware system 106, test management system 108 can identify related messages in the log of middleware system 106. The related messages can represent other logical transactions that make up the same logical process (e.g., business process).

Test management system 108 can identify the related messages based on the transaction number (or document number) associated with the originating message. Test management system 108 can query the log of middleware system 106 for messages that reference the transaction number of the originating message. In response, test management system 108 can receive from middleware system 106 the messages that reference the transaction number of the originating message. This set of messages can be referred to child messages. Test management system 108 can then repeat the query process for the child messages. For example, a purchase order message can have an invoice message as a child message, and the invoice message can have a remittance message as child of itself. Test management system 108 can repeat the query process until it receives messages that do not have further child messages. As would be appreciated by a person of ordinary skill in the art, test management system 108 can identify the related messages based on various other criteria and using various other mechanisms.

After identifying the set of messages (e.g., the originating message and related messages), test management system 108 can order the set of messages based on transaction log end date. The resulting order of the set of messages can represent the order that the corresponding test cases are run to complete the associated logical process.

Test management system 108 can also download source format 202 and target format 204 pairs for each message in the set of messages from middleware system 106. In other words, test management system 108 can download mapping 206 for the set of messages. For example, test management system 108 can download a baseline output file based on mapping 206 for the set of messages. Test management system 108 can store source format 202 and target format 204 pairs for each message in the set of messages as a baseline mapping. The baseline mapping can represent the message transformations that occurred at middleware system 106 during a previous successful completion of an associated logical process (e.g., business process). Thus, if no integration regression has occurred between source system 102 and target system 104, performing the same transactions of the set of messages of the baseline mapping should result in the same successful completion of the logical process.

Test management system 108 can create a test case 208 for each message in the set of messages. Test management system 108 can store the source format 202 and target format 204 pair for the message in the test case 208 as input 210 and output 212, respectively. Test management system 108 can further order the test cases 208 for execution based on the order of the corresponding messages.

After generating test cases 208, test management system 108 can perform each test case 208 to determine if an integration regression has occurred between source system 102 and target system 104. But test management system 108 may be unable to exchange the exact same messages through middleware system 106 as were exchanged through middleware system 106 at the time of the baseline mapping. This is because the original transaction numbers and dates associated with the baseline messages may be incompatible with the data already stored in the databases at source system 102 and target system 104. To account for this, test management system 108 can generate similar, but not identical, messages as the baseline messages when performing a test case 208. For example, test management system 108 can preserve the actual data fields in a baseline message but use new values for the transaction number and date fields.

Test management system 108 can generate similar messages by creating a new document in source system 102 that corresponds to the baseline message associated with the first test case 208. In other words, test management system 108 can start with creating a new document in source system 102 for the originating baseline message. This can cause source system 102 to generate a new message corresponding to the new document for transmission to target system 104. Test management system 108 can create the new document based on the actual data fields in the originating baseline message associated with the first test case 208. Test management system 108 can then rely on source system 102 to select a new transaction number and date field in the created document. Test management system 108 can create a new document for a message by calling an application programming interface (API) in source system 102 or target system 104. As would be appreciated by a person of ordinary skill in the art, test management system 108 can create a new document in source system 102 or target system 104 using various other mechanisms.

Test management system 108's creation of the new document can trigger the first test case 208. Test management system 108's creation of the new document can cause source system 102 to create the new document in its database, and create a corresponding message in source format 202 for transmission to target system 104 via middleware system 106. Middleware system 106 can transform the message to target format 204 and transmit the updated message to target system 104.

To confirm that the first test case 208 was successful, test management system 108 can confirm that the new document was actually created in source system 102. Moreover, test management system 108 can confirm that the associated document was also created in target system 104. Test management system 108 can confirm a document was created in source system 102 or target system 104 using an API. As would be appreciated by a person of ordinary skill in the art, test management system 108 can confirm a document was created in source system 102 or target system 104 using various other mechanisms.

To further confirm that the first test case 208 was successful, test management system 108 can compare the corresponding message in target format 204 generated for the first test case 208 to output 212 for the first test case 208 (e.g., the baseline message in target format 204). Test management system 108 can perform the comparison using difference tool 214. Difference tool 214 can perform a text comparison between two messages. As would be appreciated by a person of ordinary skill in the art, difference tool 214 can perform various other types of comparison between two messages.

Difference tool 214 can compare two messages subject to various exclusion rules. For example, difference tool 214 can avoid comparing the transaction number of the message generated for the first test case 208 to the transaction number of output 212 for the first test case 208 (e.g., the baseline message in target format 204). This is because the transaction number may always vary between two messages, and thus is irrelevant in the determining whether an integration regression occurred. Test management system 108 can therefore exclude certain fields from comparison between two messages. For example, test management system 108 may exclude the transaction and date fields from comparison. As would be appreciated by a person of ordinary skill in the art, test management system 108 can exclude various other fields from comparison. Instead, test management system 108 can compare substantive data fields such as, but not limited to, quantity ordered, price, etc. between two messages. This is because these types of fields are relevant to determining if there is an integration regression between source system 102 and target system 104.

Test management system 108 can repeat this comparison process for each test case 208 in the test suite. If all test cases 208 are performed successfully, test management system 108 can indicate that the test suite representing the logical process (e.g., business process) completed successfully. In other words, if test management system 108 determines there are no differences between the baselined messages (e.g., represented as output 212 in a test case 208) and the messages generated by the test cases 208, test management system 108 can indicate that the current deployment has caused no integration regression for the user. If test management system 108 determines there are differences between the baselined messages (e.g., represented as output 212 in a test case 208) and the messages generated by the test cases, test management system 108 can indicate there is an integration regression and alert the user to the differences. For example, test management system 108 can identify the particular test cases 208 that failed, and output the differences between the two messages for user review. The user can analyze the differences to decide that the changes are fine, or decide to raise a change request to adopt the integration with respect to the differences found.

Figure 3:
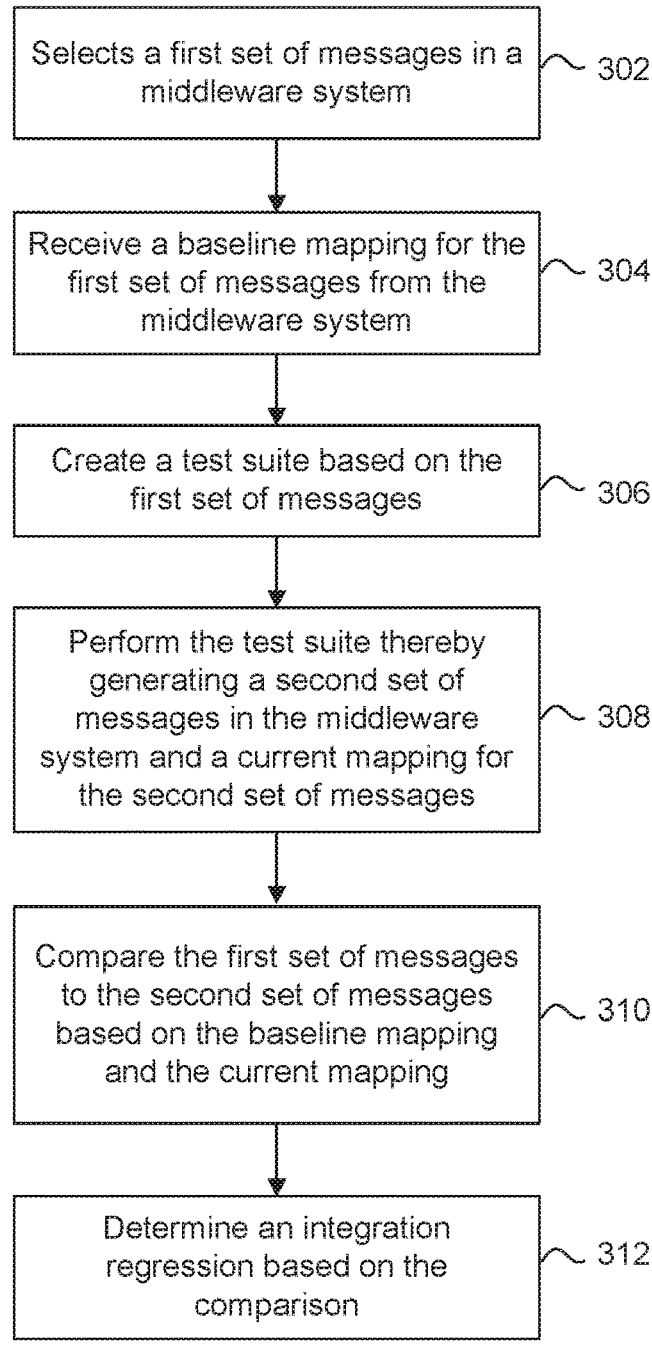
FIG. 3 is a flowchart illustrating a process for determining an integration regression between a source system and a target system, according to some embodiments.

FIG. 3 is a flowchart for a method 300 for determining an integration regression between a source system and a target system, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to those example embodiments.

In 302, test management system 108 selects a first set of messages in middleware system 106. The first set of messages can represent performance of a logical process (e.g., business process) between source system 102 and target system 104. Test management system 108 can optionally order the first set of messages based on a transaction log date.

Test management system 108 can select the first set of messages by selecting an originating message in a log of middleware system 105. The originating message can represent a first message in the logical process between source system 102 and target system 104.

In 304, test management system 108 receives a baseline mapping for the first set of messages from middleware system 106. For example, test management system 108 can receive a baseline output file based on a mapping for the first set of messages from middleware system 106. The baseline mapping can map each message in the first set of messages from source format 202 associated with source system 102 to target format 204 associated with target system 104.

In 306, test management system 108 creates a test suite based on the first set of messages. Test management system 108 can create a test case for each message in the first set of messages based on the baseline mapping.

In 308, test management system 108 executes the test suite thereby generating a second set of messages in middleware system 106 and a current mapping for the second set of messages. The current mapping can map each message in the second set of messages from a second source format 202 associated with source system 102 to a second target format 204 associated with target system 104.

In 310, test management system 108 compares, using difference tool 214, the first set of messages to the second set of messages based on the baseline mapping and the current mapping. Test management system 108, using difference tool 214, can compare the first set of messages to the second set of messages based on a set of exclusion rules. For example, test management system 108, using difference tool 214, can avoid comparing transaction numbers and date fields between two messages.

In 312, test management system 108 determines an integration regression associated with the process between the source system and the target system based on 310. For example, if test management system 108 determines there are no differences between the first set of messages (e.g., the baseline messages) and the second set of messages, test management system 108 can determine there is no integration regression. If test management system 108 determines there are differences between the first set of messages (e.g., the baseline messages) and the second set of messages, test management system 108 can determine there is an integration regression and alert a user to the differences.

Figure 4:
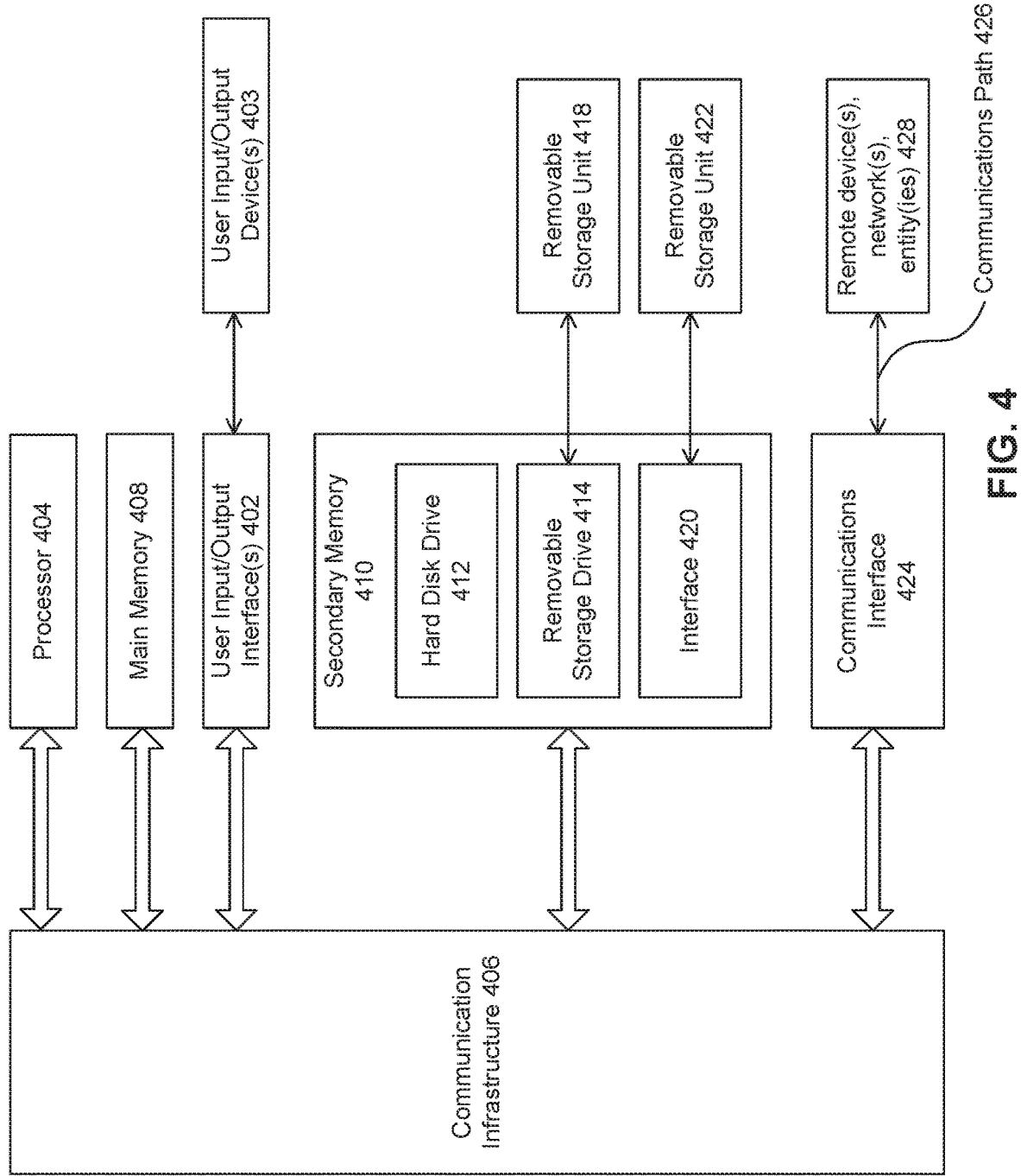
FIG. 4 is an example computer system useful for implementing various embodiments.

Various embodiments can be implemented, for example, using one or more computer systems, such as computer system 400 shown in FIG. 4. Computer system 400 can be used, for example, to implement method 400 of FIG. 4. For example, computer system 400 can determine a resource block allocation of a portion of a tone space using a lookup table. Computer system 400 can further map a plurality of tones to a resource block based on the determined resource block allocation, according to some embodiments. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVI), optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled." and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for determining an integration regression between a source system and a target system, comprising:
    selecting, by at least one processor, a first set of messages in a middleware system, wherein the first set of messages represent performance of a process between the source system and the target system;
    receiving, by the at least one processor, a baseline mapping for the first set of messages from the middleware system, wherein the baseline mapping for the first set of messages maps each message in the first set of messages from a source format associated with the source system to a target format associated with the target system;
    creating, by the at least one processor, a test suite based on the first set of messages;
    executing, by the at least one processor, the test suite, wherein the executing the test suite generates a second set of messages in the middleware system and a current mapping for the second set of messages, and wherein the current mapping for the second set of messages maps each message in the second set of messages from a second source format associated with the source system to a second target format associated with the target system;
    comparing, by the at least one processor, the first set of messages to the second set of messages based on the baseline mapping for the first set of messages and the current mapping for the second set of messages; and
    determining, by the at least one processor, the integration regression associated with the process between the source system and the target system based on the comparing the first set of messages to the second set of messages.

2. The computer-implemented method of claim 1, further comprising:
    ordering the first set of messages based on a transaction log date.

3. The computer-implemented method of claim 1, wherein the selecting comprises:
    selecting an originating message in a log of the middleware system, wherein the originating message represents a first message in the process between the source system and the target system; and
    selecting one or more messages related to the originating message in the log of the middleware system,
    wherein the first set of messages comprise the originating message and the one or more messages related to the originating message in the log of the middleware system.

4. The computer-implemented method of claim 1, wherein the creating comprises:
    creating a test case based on a message in the first set of messages and the baseline mapping for the first set of messages.

5. The computer-implemented method of claim 4, wherein the executing comprises:
    creating a new document in the source system based on the test case.

6. The computer-implemented method of claim 1, wherein the comparing comprises:
    comparing the first set of messages to the second set of messages based on a set of exclusion rules.

7. The computer-implemented method of claim 1, further comprising:
    outputting a set of differences between the first set of messages and the second set of messages based on the comparing the first set of messages to the second set of messages.

8. A system, comprising:
    a memory; and
    at least one processor coupled to the memory and configured to:
        select a first set of messages in a middleware system, wherein the first set of messages represent performance of a process between a source system and a target system;
        receive a baseline mapping for the first set of messages from the middleware system, wherein the baseline mapping for the first set of messages maps each message in the first set of messages from a source format associated with the source system to a target format associated with the target system;
        create a test suite based on the first set of messages;
        execute the test suite, wherein the executing the test suite generates a second set of messages in the middleware system and a current mapping for the second set of messages, and wherein the current mapping for the second set of messages maps each message in the second set of messages from a second source format associated with the source system to a second target format associated with the target system;
        compare the first set of messages to the second set of messages based on the baseline mapping for the first set of messages and the current mapping for the second set of messages; and
        determine an integration regression associated with the process between the source system and the target system based on the comparing the first set of messages to the second set of messages.

9. The system of claim 8, wherein the at least one processor is further configured to:

order the first set of messages based on a transaction log date.

10. The system of claim 8, wherein to select the at least one processor is further configured to:
select an originating message in a log of the middleware system, wherein the originating message represents a first message in the process between the source system and the target system; and
select one or more messages related to the originating message in the log of the middleware system,
wherein the first set of messages comprise the originating message and the one or more messages related to the originating message in the log of the middleware system.

11. The system of claim 8, wherein to create the at least one processor is further configured to:
create a test case based on a message in the first set of messages and the baseline mapping for the first set of messages.

12. The system of claim 11, wherein to execute the at least one processor is further configured to:
create a new document in the source system based on the test case.

13. The system of claim 8, wherein to compare the at least one processor is further configured to:
compare the first set of messages to the second set of messages based on a set of exclusion rules.

14. The system of claim 8, wherein the at least one processor is further configured to:
output a set of differences between the first set of messages and the second set of messages based on the comparing the first set of messages to the second set of messages.

15. A non-transitory computer-readable storage device having instructions stored thereon that, when executed by at least one computing device, causes the at least one computing device to perform operations comprising:
selecting, by at least one processor, a first set of messages in a middleware system, wherein the first set of messages represent performance of a process between a source system and a target system;
receiving, by the at least one processor, a baseline mapping for the first set of messages from the middleware system, wherein the baseline mapping for the first set of messages maps each message in the first set of messages from a source format associated with the source system to a target format associated with the target system;
creating, by the at least one processor, a test suite based on the first set of messages;
executing, by the at least one processor, the test suite, wherein the executing the test suite generates a second set of messages in the middleware system and a current mapping for the second set of messages, and wherein the current mapping for the second set of messages maps each message in the second set of messages from a second source format associated with the source system to a second target format associated with the target system;
comparing, by the at least one processor, the first set of messages to the second set of messages based on the baseline mapping for the first set of messages and the current mapping for the second set of messages; and
determining, by the at least one processor, an integration regression associated with the process between the source system and the target system based on the comparing the first set of messages to the second set of messages.

16. The non-transitory computer-readable storage device of claim 15, wherein the operations further comprise:
ordering the first set of messages based on a transaction log date.

17. The non-transitory computer-readable storage device of claim 15, wherein the selecting comprises:
selecting an originating message in a log of the middleware system, wherein the originating message represents a first message in the process between the source system and the target system; and
selecting one or more messages related to the originating message in the log of the middleware system,
wherein the first set of messages comprise the originating message and the one or more messages related to the originating message in the log of the middleware system.

18. The non-transitory computer-readable storage device of claim 15, wherein the creating comprises:
creating a test case based on a message in the first set of messages and the baseline mapping for the first set of messages.

19. The non-transitory computer-readable storage device of claim 18, wherein the executing comprises:
creating a new document in the source system based on the test case.

20. The non-transitory computer-readable storage device of claim 15, wherein the comparing comprises:
comparing the first set of messages to the second set of messages based on a set of exclusion rules.

* * * * *